(12) United States Patent
Hamaguchi

(10) Patent No.: US 12,211,974 B2
(45) Date of Patent: Jan. 28, 2025

(54) SECONDARY BATTERY, BATTERY PACK, ELECTRONIC DEVICE, ELECTRIC TOOL, ELECTRIC AIRCRAFT, AND ELECTRIC VEHICLE

(71) Applicant: MURATA MANUFACTURING CO., LTD., Kyoto (JP)

(72) Inventor: Kuniaki Hamaguchi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 529 days.

(21) Appl. No.: 17/579,869

(22) Filed: Jan. 20, 2022

(65) Prior Publication Data

US 2022/0149441 A1    May 12, 2022

Related U.S. Application Data

(63) Continuation of application No. PCT/JP2020/029450, filed on Jul. 31, 2020.

(30) Foreign Application Priority Data

Aug. 6, 2019  (JP) .................................. 2019-144523

(51) Int. Cl.
*H01M 10/0587*   (2010.01)
*B60L 50/60*     (2019.01)
(Continued)

(52) U.S. Cl.
CPC ......... *H01M 10/0587* (2013.01); *B60L 50/66* (2019.02); *B60L 58/10* (2019.02);
(Continued)

(58) Field of Classification Search
None
See application file for complete search history.

(56) References Cited

U.S. PATENT DOCUMENTS 3,761,314 A     9/1973  Cailley
2002/0191370 A1  12/2002 Matsuoka et al.
(Continued)

FOREIGN PATENT DOCUMENTS

CN    102544599    7/2012
CN    102683634    9/2012
(Continued)

OTHER PUBLICATIONS

Machine translation of JP2001160387A (Year: 2024).*

(Continued)

*Primary Examiner* — Brian R Ohara
*Assistant Examiner* — Michelle T Leonard
(74) *Attorney, Agent, or Firm* — K&L Gates LLP

(57) ABSTRACT

A secondary battery including an electrode wound body having a structure in which a positive electrode and a negative electrode are stacked and wound with a separator interposed therebetween, a positive electrode current collector plate, a negative electrode current collector plate, and an exterior can that accommodates the electrode wound body, the positive electrode current collector plate, and the negative electrode current collector plate. The positive electrode has a first covered portion covered with a positive electrode active material layer and a positive electrode active material non-covered portion on a positive electrode foil, and the negative electrode has a second covered portion covered with a negative electrode active material layer and a negative electrode active material non-covered portion on a negative electrode foil.

15 Claims, 14 Drawing Sheets

(51) Int. Cl.
  *B60L 58/10* (2019.01)
  *B64C 27/00* (2006.01)
  *H01M 4/66* (2006.01)
  *H01M 10/0525* (2010.01)
  *H01M 10/42* (2006.01)
  *H01M 50/202* (2021.01)
  *H01M 50/247* (2021.01)
  *H01M 50/249* (2021.01)
  *H01M 50/559* (2021.01)
  *H01M 50/593* (2021.01)

(52) U.S. Cl.
  CPC ............. *B64C 27/00* (2013.01); *H01M 4/662* (2013.01); *H01M 10/0525* (2013.01); *H01M 10/425* (2013.01); *H01M 50/202* (2021.01); *H01M 50/247* (2021.01); *H01M 50/249* (2021.01); *H01M 50/559* (2021.01); *H01M 50/593* (2021.01); *H01M 2220/20* (2013.01); *H01M 2220/30* (2013.01)

(56) References Cited

U.S. PATENT DOCUMENTS

| | | | |
|---|---|---|---|
| 2012/0088137 A1* | 4/2012 | Nakura | H01M 10/052 429/211 |
| 2012/0171535 A1 | 7/2012 | Ma | |
| 2018/0203069 A1* | 7/2018 | Mori | G01R 31/396 |

FOREIGN PATENT DOCUMENTS

| | | | | |
|---|---|---|---|---|
| JP | 471520 | A | 1/1972 | |
| JP | 2000323165 | | 11/2000 | |
| JP | 2001028274 | A | 1/2001 | |
| JP | 200168379 | A | 3/2001 | |
| JP | 2001148238 | | 5/2001 | |
| JP | 2008010400 | A * | 1/2008 | ........ H01M 10/0431 |
| JP | 2008311184 | | 12/2008 | |
| JP | 2015106613 | A | 6/2015 | |
| JP | 2015106614 | A | 6/2015 | |
| KR | 1020060022358 | A | 3/2006 | |
| WO | 2012/114586 | | 8/2012 | |

OTHER PUBLICATIONS

Machine translation of JP2008010400A (Year: 2024).*
Chinese Office Action issued Dec. 30, 2023 in corresponding Chinese Application No. 202080048801.9.
International Search Report of corresponding PCT application PCT/JP2020/029450, dated Oct. 20, 2020.
Japanese Office Action issued Mar. 8, 2022 in corresponding Japanese Application No. 2021-537289.

* cited by examiner

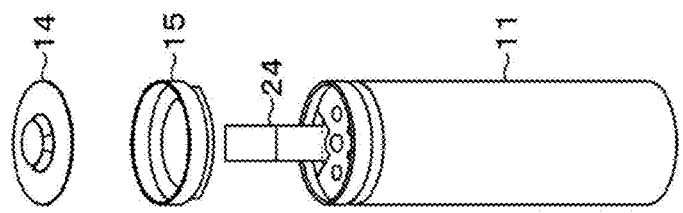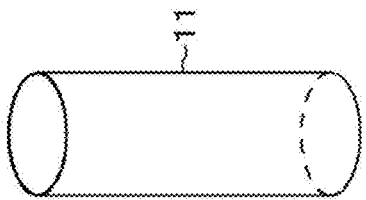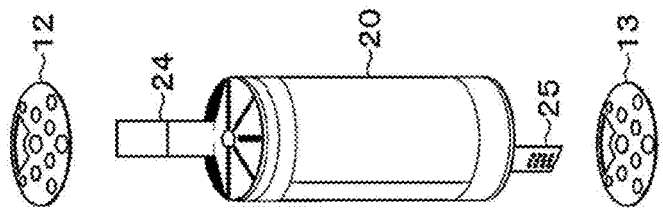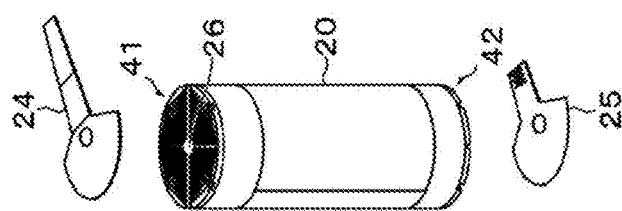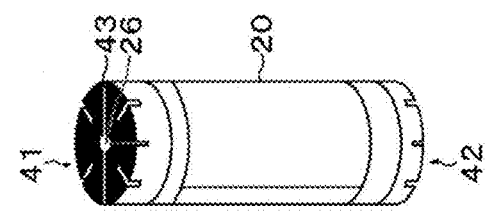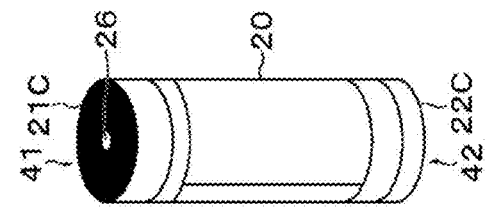

SECONDARY BATTERY, BATTERY PACK, ELECTRONIC DEVICE, ELECTRIC TOOL, ELECTRIC AIRCRAFT, AND ELECTRIC VEHICLE

CROSS REFERENCE TO RELATED APPLICATIONS

The present application is a continuation of PCT patent application no. PCT/JP2020/029450, filed on Jul. 31, 2020, which claims priority to Japanese patent application no. JP2019-144523 filed on Aug. 6, 2019, the entire contents of which are being incorporated herein by reference.

BACKGROUND

The present disclosure generally relates to a secondary battery, a battery pack, an electronic device, an electric tool, an electric aircraft, and an electric vehicle.

Lithium ion batteries have been developed for applications requiring high output such as electric tools and automobiles. One method for achieving high output is high rate discharge in which a relatively large current flows from a battery. In high rate discharge, a large current flows, and therefore internal resistance of a battery becomes a problem.

SUMMARY

The present disclosure generally relates to a secondary battery, a battery pack, an electronic device, an electric tool, an electric aircraft, and an electric vehicle.

In one type of conventional battery technology with the auxiliary groove having a constant depth, there is a problem that wrinkles and asperities are generated in the end face, the current collectors do not have close contact to each other, a gap is generated, and a welding defect due to perforation occurs.

An object of the present disclosure is to provide a battery having a groove shape that does not cause welding defects.

In order to solve the above-described problems, the present disclosure provides a secondary battery according to an embodiment including:
  an electrode wound body having a structure in which a positive electrode and a negative electrode are stacked and wound with a separator interposed therebetween;
  a positive electrode current collector plate;
  a negative electrode current collector plate; and
  an exterior can that accommodates the electrode wound body, the positive electrode current collector plate, and the negative electrode current collector plate,
  where
  the positive electrode has a first covered portion covered with a positive electrode active material layer and a positive electrode active material non-covered portion on a positive electrode foil,
  the negative electrode has a second covered portion covered with a negative electrode active material layer and a negative electrode active material non-covered portion on a negative electrode foil,
  the positive electrode active material non-covered portion is joined to the positive electrode current collector plate on a first end face of the electrode wound body,
  the negative electrode active material non-covered portion is joined to the negative electrode current collector plate on a second end face of the electrode wound body,
  one or both of the positive electrode active material non-covered portion and the negative electrode active material non-covered portion have a surface formed by at least one of the positive or negative electrode active material non-covered portion bending and overlapping toward a central axis of the wound structure,
  the surface has at least one groove extending from an inner peripheral portion toward an outer peripheral portion of the electrode wound body, and
  a depth of the groove in the inner peripheral portion is smaller than the groove in the outer peripheral portion.

The present disclosure provides a battery pack according to an embodiment including:
  the above-described secondary battery;
  a controller configured to control the secondary battery; and
  an exterior body enclosing the secondary battery.

The present disclosure provides an electronic device according to an embodiment including the above-described secondary battery or the above-described battery pack.

The present disclosure provides an electric tool according to an embodiment including the above-described battery pack and using the battery pack as a power source.

The present disclosure provides an electric aircraft according to an embodiment including:
  the above-described battery pack;
  a plurality of rotary wings;
  a motor for rotating each of the rotary wings;
  a support shaft that supports each of the rotary wings and the motor;
  a motor controller configured to control rotation of the motor; and
  a power supply line for supplying power to the motor,
  wherein the battery pack is connected to the power supply line.

The present disclosure provides an electric vehicle according to an embodiment including:
  the above-described secondary battery;
  a conversion device that receives supply of electric power from the secondary battery to convert the electric power into a driving force of the electric vehicle; and
  a controller configured to perform information processing related to vehicle control based on information related to the secondary battery.

According to at least the embodiment of the present disclosure, the foil and the current collector plate can be reliably welded, the internal resistance of the battery can be reduced, or a high output battery can be realized.

It should be understood that the contents of the present disclosure are not to be construed as being limited by the effects exemplified in the present specification, and additional effects may be further provided.

BRIEF DESCRIPTION OF THE FIGURES

FIGS. 4A to 4F are views for describing an assembly process of the battery according to an embodiment of the present disclosure.

DETAILED DESCRIPTION

As described herein, the present disclosure will be described based on examples with reference to the drawings, but the present disclosure is not to be considered limited to the examples, and various numerical values and materials in the examples are considered by way of example.

In the embodiment of the present disclosure, as a secondary battery, a lithium ion battery having a cylindrical shape will be described as an example.

Figure 1:
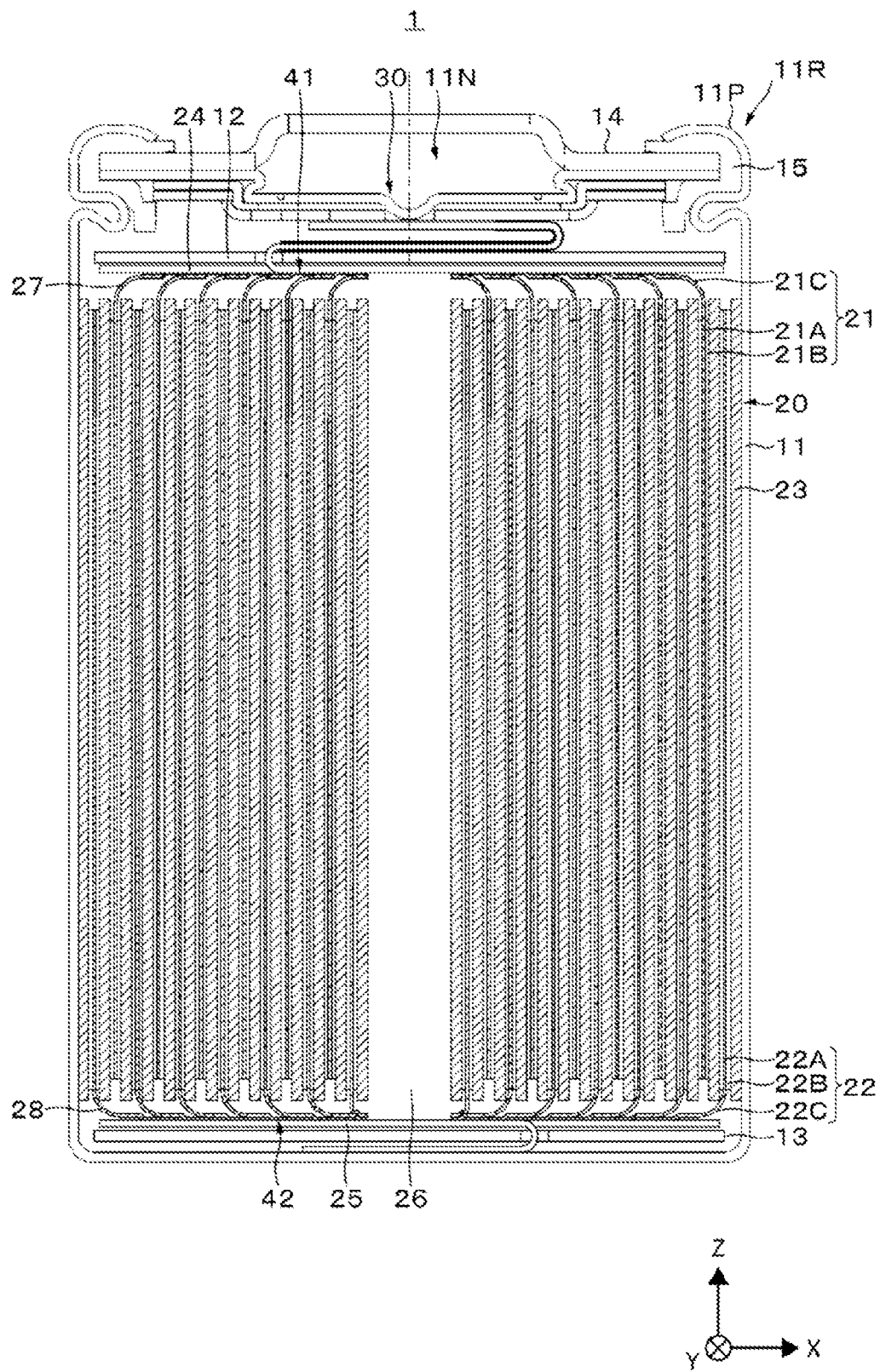
FIG. 1 is a sectional view of a battery according to one embodiment of the present disclosure.

First, the overall configuration of the lithium ion battery will be described. FIG. 1 is a schematic sectional view of a lithium ion battery 1. The lithium ion battery 1 is, for example a cylindrical lithium ion battery 1 including an electrode wound body 20 accommodated inside an exterior can 11 as shown in FIG. 1.

Specifically, the lithium ion battery 1 includes, for example, a pair of insulating plates 12 and 13 and the electrode wound body 20 inside the exterior can 11 having a cylindrical shape. The lithium ion battery 1 may further include, for example, one kind, or two or more kinds of a positive temperature coefficient (PTC) element, a reinforcing member, and the like inside the exterior can 11.

The exterior can 11 is a member that mainly accommodates the electrode wound body 20. The exterior can 11 is, for example, a cylindrical container in which one end portion is open and the other end portion is closed. That is, the exterior can 11 has an open end face (open end face 11N). The exterior can 11 contains, for example, one kind, or two or more kinds of metal materials such as iron, aluminum, and alloys thereof. Note that, for example one kind, or two or more kinds of metal materials such as nickel may be plated on the surface of exterior can 11.

The insulating plates 12 and 13 are dish-shaped plates having a face substantially perpendicular to a winding axis (Z axis in FIG. 1) of the electrode wound body 20. The insulating plates 12 and 13 are disposed for example in such a manner as to sandwich the electrode wound body 20 therebetween.

At the open end face 11N of the exterior can 11, a crimp structure 11R is formed in which a battery lid 14 and a safety valve mechanism 30 are crimped with a gasket 15. This allows the exterior can 11 to be sealed in a state where the electrode wound body 20 and the like are accommodated inside the exterior can 11.

The battery lid 14 is a member that mainly closes the open end face 11N of the exterior can 11 in a state where the electrode wound body 20 and the like are accommodated inside the exterior can 11. The battery lid 14 contains, for example, the same material as the material for forming the exterior can 11. A central region of the battery lid 14 protrudes, for example in a +Z direction. This allows a region (peripheral region) other than the central region of the battery lid 14 to be in contact with, for example, the safety valve mechanism 30.

The gasket 15 is a member that mainly seals a gap between the bent portion 11P of the exterior can 11 and the battery lid 14 by being interposed between the exterior can 11 (bent portion 11P) and the battery lid 14. For example, asphalt or the like may be applied to the surface of the gasket 15.

The gasket 15 contains, for example, one kind, or two or more kinds of insulating materials. The kind of the insulating material is not particularly limited, and is, for example, a polymer material such as polybutylene terephthalate (PBT) or polypropylene (PP). Among them, the insulating material is preferably polybutylene terephthalate. This is because the gap between the bent portion 11P and the battery lid 14 is sufficiently sealed while the exterior can 11 and the battery lid 14 are electrically separated from each other.

The safety valve mechanism 30 mainly releases the internal pressure of the exterior can 11 by canceling the sealed state of the exterior can 11 as necessary when the pressure inside the exterior can 11 (internal pressure) increases. The cause of the increase in the internal pressure of exterior can 11 is, for example, a gas generated due to a decomposition reaction of an electrolyte solution during charging and discharging.

In the cylindrical lithium ion battery, a positive electrode 21 having a band shape and a negative electrode 22 having a band shape are spirally wound with the separator 23 interposed therebetween, and are accommodated in the exterior can 11 in a state of being impregnated with an electrolyte solution. The positive electrode 21 is obtained by forming a positive electrode active material layer 21B on one face or both faces of a positive electrode foil 21A. The material of the positive electrode foil 21A is, for example, a metal foil made of aluminum or an aluminum alloy. The negative electrode 22 is obtained by forming a negative electrode active material layer 22B on one face or both faces of a negative electrode foil 22A. The material of the negative electrode foil 22A is, for example, a metal foil made of nickel, a nickel alloy, copper, or a copper alloy. The separator 23 is a porous insulating film, which enables movement of substances such as ions and an electrolyte solution while electrically insulating the positive electrode 21 and the negative electrode 22.

The positive electrode active material layer 21B and the negative electrode active material layer 22B cover many portions of the positive electrode foil 21A and the negative electrode foil 22A, respectively, but intentionally neither of them covers the periphery of one end in the short axis direction of the band. Hereinafter, a portion not covered with the active material layer 21B or the active material layer 22B is appropriately referred to as an active material non-covered portion. In the cylindrical battery, the electrode wound body 20 is wound such that a positive electrode active material non-covered portion 21C and a negative electrode active material non-covered portion 22C overlap and face in opposite directions with the separator 23 interposed therebetween.

Figure 2:
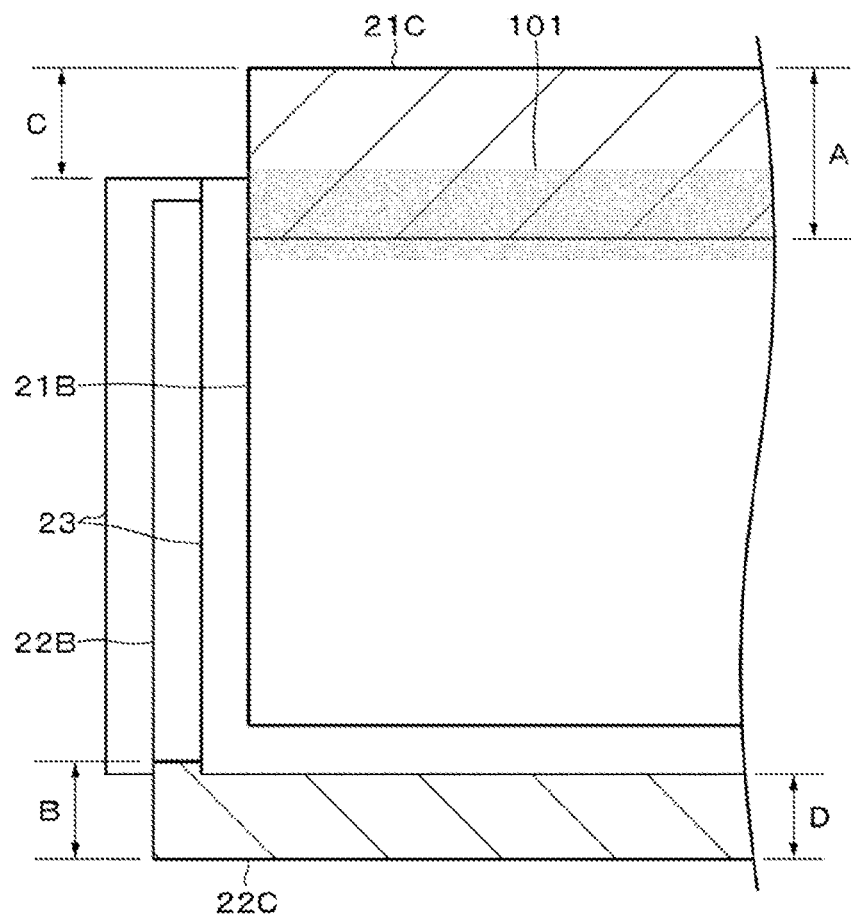
FIG. 2 is a view for describing one example of an arrangement relationship between a positive electrode, a negative electrode, and a separator in an electrode wound body according to an embodiment of the present disclosure.

FIG. 2 shows one example of a structure before winding in which the positive electrode 21, the negative electrode 22, and the separator 23 are stacked. The width of the positive electrode active material non-covered portion 21C (the upper hatched portion in FIG. 2) is A, and the width of the negative electrode active material non-covered portion 22C (the lower hatched portion in FIG. 2) is B. In one embodiment, A>B is preferable, for example, A=7 (mm) and B=4 (mm). The length of a protruding portion of the positive electrode active material non-covered portion 21C from one end of the separator 23 in the width direction is C, and the length of a protruding portion of the negative electrode active material non-covered portion 22C from the other end of the separator 23 in the width direction is D. In one embodiment, C>D is preferable, for example, C=4.5 (mm) and D=3 (mm).

Because the positive electrode active material non-covered portion 21C is made of, for example, aluminum, and the negative electrode active material non-covered portion 22C is made of, for example, copper, the positive electrode active material non-covered portion 21C is typically softer (has a lower Young's modulus) than the negative electrode active material non-covered portion 22C. Therefore, in one embodiment, A>B and C>D are more preferable. In this case, when the positive electrode active material non-covered portion 21C and the negative electrode active material non-covered portion 22C are simultaneously bent at the same pressure from both electrode sides, the height of the bent portion measured from the tip of the separator 23 is the same between the positive electrode 21 and the negative electrode 22 in some cases. In such a case, because the active material non-covered portions 21C and 22C are bent and appropriately overlap, the active material non-covered portions 21C and 22C and current collector plates 24 and 25 can be easily joined by laser welding. Joining in one embodiment means joining by laser welding, but the joining method is not limited to laser welding.

In the positive electrode 21, a section having a width of 3 mm including a boundary between the active material non-covered portion 21C and an active material covered portion 21B is covered with an insulating layer 101 (gray region in FIG. 2). Then, the whole region of the positive electrode active material non-covered portion 21C facing a negative electrode active material covered portion 22B with the separator interposed therebetween is covered with the insulating layer 101. The insulating layer 101 has an effect of reliably preventing an internal short circuit of the battery 1 when a foreign matter enters between the negative electrode active material covered portion 22B and the positive electrode active material non-covered portion 21C. In addition, when an impact is applied to the battery 1, the insulating layer 101 has an effect of absorbing the impact and reliably preventing bending of the positive electrode active material non-covered portion 21C and a short circuit with the negative electrode 22.

A through hole 26 is formed at the central axis of the electrode wound body 20. The through hole 26 is a hole for inserting a winding core for assembling the electrode wound body 20 and an electrode rod for welding. Because the electrode wound body 20 is wound in which the positive electrode active material non-covered portion 21C and the negative electrode active material non-covered portion 22C overlap such that they face in opposite directions, the positive electrode active material non-covered portion 21C gathers in one face (end face 41) of the end portion of the electrode wound body, and the negative electrode active material non-covered portion 22C gathers in the other face (end face 42) of the end portion of the electrode wound body 20. To improve the contact with the current collector plates 24 and 25 for extracting current, the active material non-covered portions 21C and 22C are bent, and the end faces 41 and 42 are flat faces. The direction to bend is a direction from the outer edges 27 and 28 of the end faces 41 and 42 toward the through hole 26, and the active material non-covered portions on the adjacent circumferences overlap and are bent in a wound state. In the present specification, "flat face" includes not only an exactly flat face but also a surface having some asperities and surface roughness to the extent that the active material non-covered portion and the current collector plate can be joined.

When the active material non-covered portions 21C and 22C are bent in such a manner as to overlap each other, it seems that the end faces 41 and 42 can be made flat, but when no processing is performed before bending, wrinkles or voids (gap, space) are generated in the end faces 41 and 42 at the time of bending, and the end faces 41 and 42 do not become flat faces. Here, "wrinkles" and "voids" are portions where unevenness occurs in the bent active material non-covered portions 21C and 22C and the end faces 41 and 42 do not become flat surfaces. To prevent the occurrence of the wrinkles and voids, grooves 43 (see, for example FIG. 4B) are formed in advance in the radial direction from the through hole 26. The grooves 43 extend from the outer edges 27, 28 of the end faces 41, 42 to the through hole 26. The through hole 26 is positioned at the center of the electrode wound body 20. The through hole 26 is used as a hole into which a welding tool is inserted in the assembly process of the lithium ion battery 1. The active material non-covered portions 21C and 22C at the start of winding of the positive electrode 21 and the negative electrode 22 near the through hole 26 have notches. These are for preventing the through hole 26 from being closed when the active material non-covered portions bent toward the through hole 26. The grooves 43 remain in the flat face after the active material non-covered portions 21C and 22C are bent, and a portion without the grooves 43 is joined (welded or the like) to the positive electrode current collector plate 24 or the negative electrode current collector plate 25. Not only the flat face but also the grooves 43 may be joined to a part of the current collector plates 24 and 25.

A detailed configuration of the electrode wound body 20, that is, a detailed configuration of each of the positive electrode 21, the negative electrode 22, the separator 23, and the electrolyte solution will be described later.

In a typical lithium ion battery, for example, a lead for current extraction is welded to one point of each of the positive electrode and the negative electrode, but this is not suitable for high rate discharge because the internal resistance of the battery is large, and the lithium ion battery generates heat and has high temperature during discharging. Therefore, in the lithium ion battery of one embodiment, the positive electrode current collector plate 24 and the negative electrode current collector plate 25 are disposed on the end faces 41 and 42, and are welded at multiple points to the active material non-covered portions 21C and 22C of the positive electrode and the negative electrode present on the end faces 41 and 42, thereby suppressing the internal resistance of the battery to be low. The end faces 41 and 42 being bent and being flat faces also contribute to lowering the resistance.

Figure 3A:
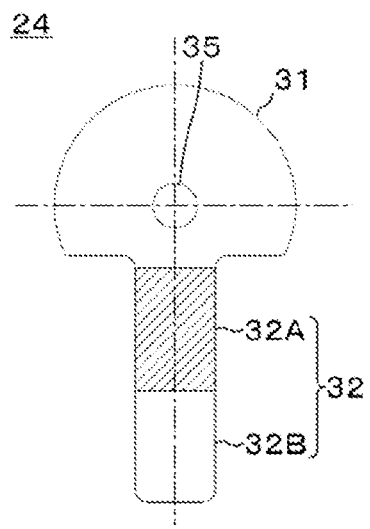
FIG. 3A is a plan view of a positive electrode current collector plate according to an embodiment of the present disclosure.
Figure 3B:
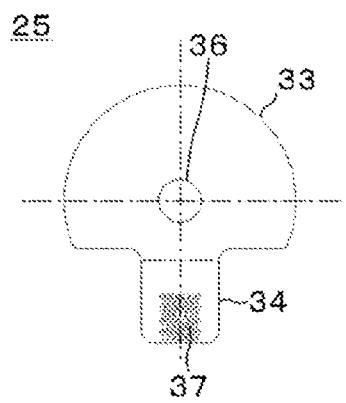
FIG. 3B is a plan view of a negative electrode current collector plate according to an embodiment of the present disclosure.

FIGS. 3A and 3B show one example of a current collector plate. FIG. 3A shows the positive electrode current collector plate 24, and FIG. 3B shows the negative electrode current collector plate 25. The material of the positive electrode current collector plate 24 is, for example, a metal plate made of a simple substance or a composite material of aluminum or an aluminum alloy, and the material of the negative electrode current collector plate 25 is, for example, a metal plate made of a simple substance or a composite material of nickel, a nickel alloy, copper, or a copper alloy. As shown in FIG. 3A, the positive electrode current collector plate 24 has a shape in which the band-shaped portion 32 having a rectangular shape is attached to a fan-shaped portion 31 having a flat fan shape. A hole 35 is formed near the center of the fan-shaped portion 31, and the hole 35 is located at a position corresponding to the through hole 26.

A hatched portion in FIG. 3A is an insulating portion 32A in which an insulating tape is attached or an insulating material is applied to the band-shaped portion 32, and a portion below the hatched portion in the drawing is a connecting portion 32B to a sealing plate also serving as an external terminal. When the battery structure does not include a metal center pin (not shown) in the through hole 26, the possibility of the band-shaped portion 32 coming into contact with a portion having a negative electrode potential is low, and therefore it is not necessary to provide the insulating portion 32A. In such a case, the width between the positive electrode 21 and the negative electrode 22 can be increased by an amount corresponding to the thickness of the insulating portion 32A to increase the charge-discharge capacity.

The negative electrode current collector plate 25 has substantially the same shape as the positive electrode current collector plate 24, but has a different band-shaped portion. A band-shaped portion 34 of the negative electrode current collector plate in FIG. 3B is shorter than the band-shaped portion 32 of the positive electrode current collector plate, and has no portion corresponding to the insulating portion 32A. The band-shaped portion 34 includes a circular projection 37 indicated by a plurality of circles. In resistance welding, current is concentrated on the projections, and the projections melt to weld the band-shaped portion 34 to the bottom of the exterior can 11. Similarly to the positive electrode current collector plate 24, the negative electrode current collector plate 25 has a hole 36 near the center of the fan-shaped portion 33, and the hole 36 is located at a position corresponding to the through hole 26. The fan-shaped portion 31 of the positive electrode current collector plate 24 covers a part of the end face 41 and the fan-shaped portion 33 of the negative electrode current collector plate 25 covers a part of the end face 42 because they are formed in a fan shape. The reason for not covering the whole is to allow the electrolyte solution to smoothly permeate the electrode wound body when the battery is assembled, or to easily release the gas generated when the battery is in an abnormally high temperature state or an overcharged state to the outside of the battery.

The positive electrode active material layer 21B contains, as a positive electrode active material, one kind, or two or more kinds of positive electrode materials capable of occluding and releasing lithium. The positive electrode active material layer 21B may further contain one kind, or two or more kinds of other materials such as a positive electrode binder and a positive electrode conductive agent. The positive electrode material is preferably a lithium-containing compound, and more specifically, is preferably a lithium-containing composite oxide, a lithium-containing phosphate compound, or the like.

The lithium-containing composite oxide is an oxide containing lithium and one kind, or two or more kinds of other elements (elements other than lithium) as constituent elements, and has, for example, any one of a layered rock salt type crystal structure, a spinel type crystal structure, and the like. The lithium-containing phosphate compound is a phosphate compound containing lithium and one kind, or two or more kinds of other elements as constituent elements, and has, for example, an olivine type crystal structure.

The positive electrode binder contains, for example, one kind, or two or more kinds of synthetic rubber, a polymer compound, and the like. Examples of the synthetic rubber include styrene-butadiene-based rubber, fluorine-based rubber, and ethylene propylene diene. Examples of the polymer compound include polyvinylidene fluoride and polyimide.

The positive electrode conductive agent contains, for example, one kind, or two or more kinds of carbon materials and the like. Examples of the carbon material include graphite, carbon black, acetylene black, and Ketjen Black. Ketjen Black is a registered trademark for a carbon black material. The positive electrode conductive agent may also be a metal material, a conductive polymer, or the like as long as it is a material having conductivity.

The surface of the negative electrode foil 22A is preferably roughened. This is because close contact of the negative electrode active material layer 22B to the negative electrode foil 22A improves by a so-called anchor effect. In this case, the surface of the negative electrode foil 22A may be roughened at least in a region facing the negative electrode active material layer 22B. The roughening method is, for example, a method of forming fine particles by an electrolytic treatment. In the electrolytic treatment, fine particles are formed on the surface of the negative electrode foil 22A by an electrolytic method in an electrolysis tank, and therefore asperities are provided on the surface of the negative electrode foil 22A. A copper foil produced by an electrolytic method is typically called an electrolytic copper foil.

The negative electrode active material layer 22B contains, as a negative electrode active material, one kind, or two or more kinds of negative electrode materials capable of occluding and releasing lithium. The negative electrode active material layer 22B may further contain one kind, or two or more kinds of other materials such as a negative electrode binder and a negative electrode conductive agent.

The negative electrode material is, for example, a carbon material. This is because very few changes occur in the crystal structure at the time of occlusion and release of lithium and therefore a high energy density can be stably obtained. This is also because the carbon material also functions as a negative electrode conductive agent, and therefore the conductivity of the negative electrode active material layer 22B improves.

Examples of the carbon material include graphitizable carbon, non-graphitizable carbon, and graphite. Note that the interplanar spacing of the (002) plane in the non-graphitizable carbon is preferably 0.37 nm or more, and the interplanar spacing of the (002) plane in the graphite is preferably 0.34 nm or less. More specifically, the carbon material is, for example, pyrolytic carbons, cokes, glassy carbon fibers, organic polymer compound fired bodies, activated carbon, carbon blacks, and the like. Examples of the cokes include pitch coke, needle coke, and petroleum coke. The organic polymer compound fired body is obtained by firing (carbonizing) a polymer compound such as phenol resin or furan resin at an appropriate temperature. In addition, the carbon material may be low crystalline carbon subjected to a heat treatment at a temperature of about 1000° C. or less, or may be amorphous carbon. The shape of the carbon material may be any of a fibrous shape, a spherical shape, a granular shape, and a scaly shape.

In the lithium ion battery 1, when the open circuit voltage (that is, the battery voltage) at the time of full charge is 4.25 V or more, the release amount of lithium per unit mass increases as compared with the case where the open circuit voltage at the time of full charge is 4.20 V with the same positive electrode active material, and therefore the amounts of the positive electrode active material and the negative electrode active material are adjusted accordingly. As a result, a high energy density can be obtained.

The separator 23 is interposed between the positive electrode 21 and the negative electrode 22, and allows lithium ions to pass while preventing a short circuit of current due to contact between the positive electrode 21 and the negative electrode 22. The separator 23 is, for example, one kind, or two or more kinds of porous membranes such as synthetic resin and ceramics, and may be a layered membrane of two or more kinds of porous membranes. Examples of the synthetic resin include polytetrafluoroethylene, polypropylene, and polyethylene.

In particular, the separator 23 may include, for example, the above-described porous film (substrate layer) and a polymer compound layer provided on one face or both faces of the substrate layer. This is because close contact of the separator 23 to each of the positive electrode 21 and the negative electrode 22 improves, which suppresses the distortion of the electrode wound body 20. This suppresses the decomposition reaction of the electrolyte solution and the leakage of the electrolyte solution impregnated in the substrate layer, and therefore the resistance is less likely to increase when charging and discharging are repeated, and the battery swelling is suppressed.

The polymer compound layer contains, for example, a polymer compound such as polyvinylidene fluoride. This is because it is excellent in physical strength and electrochemically stable. However, the polymer compound may be a compound other than polyvinylidene fluoride. In the case of forming the polymer compound layer, for example, a solution in which a polymer compound is dissolved in an organic solvent or the like is applied to the substrate layer, and then the substrate layer is dried. The substrate layer may be immersed in the solution and thereafter dried. The polymer compound layer may contain, for example, one kind, or two or more kinds of insulating particles such as inorganic particles. The kind of the inorganic particles is, for example, aluminum oxide, aluminum nitride, or the like.

The electrolyte solution contains a solvent and an electrolyte salt. The electrolyte solution may further contain one kind, or two or more kinds of other materials such as additives.

The solvent contains one kind, or two or more kinds of nonaqueous solvents such as organic solvents. The electrolyte solution containing a nonaqueous solvent is a so-called nonaqueous electrolyte solution.

Examples of the nonaqueous solvent include a cyclic carbonate ester, a chain carbonate ester, a lactone, a chain carboxylate ester, and a nitrile (mononitrile).

The electrolyte salt contains, for example, one kind, or two or more kinds of salts such as a lithium salt. The electrolyte salt may contain, for example, a salt other than the lithium salt. The salt other than lithium is, for example, a salt of a light metal other than lithium.

Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SF_6$), lithium chloride (LiCl), and lithium bromide (LiBr).

Among them, one kind, or two or more kinds of lithium hexafluorophosphate, lithium tetrafluoroborate, lithium perchlorate, and lithium hexafluoroarsenate are preferable, and lithium hexafluorophosphate is more preferable.

The content of the electrolyte salt is not particularly limited, and is preferably 0.3 mol/kg to 3 mol/kg with respect to the solvent.

A method for producing the lithium ion battery 1 of one embodiment will be described with reference to FIGS. 4A to 4F. First, a positive electrode active material was applied to the surface of the positive electrode foil 21A having a band shape to form a covered portion of the positive electrode 21, and a negative electrode active material was applied to the surface of the negative electrode foil 22A having a band shape to form a covered portion of the negative electrode 22. At this time, the active material non-covered portions 21C and 22C where the positive active material or the negative active material was not applied were produced at one end in the lateral direction of the positive electrode 21 and one end in the lateral direction of the negative electrode 22. A notch was made in a part of the active material non-covered portions 21C and 22C, the part corresponding to the winding start in winding. Steps such as drying were performed on the positive electrode 21 and the negative electrode 22. Then, the positive electrode 21 and the negative electrode 22 were overlaid with the separator 23 interposed therebetween such that the positive electrode active material non-covered portion 21C and the negative electrode active material non-covered portion 22C face in opposite directions, and they were wound in a spiral shape in such a manner as to form the through hole 26 in the central axis and to dispose the produced notch in the vicinity of the central axis, whereby the electrode wound body 20 as shown in FIG. 4A was produced.

Next, as shown in FIG. 4B, an end of a thin flat plate (for example having a thickness of 0.5 mm) or the like was pressed perpendicularly to the end faces 41 and 42, whereby the end faces 41 and 42 were locally bent to produce the grooves 43. In this manner, the grooves 43 extending radially from the through hole 26 toward the central axis were produced. The number and arrangement of the grooves 43 shown in FIG. 4B are merely one example. Then, as shown in FIG. 4C, the same pressure was simultaneously applied from both electrode sides in a direction substantially perpendicular to the end faces 41 and 42, and the positive electrode active material non-covered portion 21C and the negative electrode active material non-covered portion 22C were bent to form the end faces 41 and 42 of flat faces. At this time, a load was applied with a plate face of a flat plate or the like such that the active material non-covered portions on the end faces 41 and 42 overlap and are bent toward the through hole 26 side. Thereafter, the fan-shaped portion 31 of the positive electrode current collector plate 24 was laser-welded to the end face 41, and the fan-shaped portion 33 of the negative electrode current collector plate 25 was laser-welded to the end face 42.

Thereafter, as shown in FIG. 4D, the band-shaped portions 32 and 34 of the current collector plates 24 and 25 were bent, the insulating plates 12 and 13 (or insulating tapes) were attached to the positive electrode current collector plate 24 and the negative electrode current collector plate 25, the electrode wound body 20 assembled as described above was inserted into the exterior can 11 shown in FIG. 4E, and the bottom of the exterior can 11 was welded. After the electrolyte solution was injected into the exterior can 11, the exterior can 11 was sealed with the gasket 15 and the battery lid 14 as shown in FIG. 4F.

EXAMPLES

Hereinafter, the present disclosure will be specifically described based on Examples in which differences in welding defect rate were compared using the lithium ion battery 1 produced as described above. The present disclosure is not limited to Examples described below.

In all of the following Examples and Comparative Examples, the battery size was 21700, the width of the positive electrode active material layer 21B was 59 (mm), the width of the negative electrode active material layer 22B was 62 (mm), and the width of the separator 23 was 64 (mm). The separator 23 was overlaid in such a manner as to cover the whole range of the positive electrode active material layer 21B and the negative electrode active material layer 22B, the width of the positive electrode active material non-covered portion was 7 (mm), and the width of the negative electrode active material non-covered portion was 4 (mm). The number of the grooves 43 (or grooves 61, 62, or 63) was four, and the grooves were arranged at substantially equal angular intervals. The width of each groove 43 (or groove 61, 62, or 63) was from 1 (mm) to 2 (mm). The material of the positive electrode foil was Al, and the material of the negative electrode foil was Cu.

Example 1

Figure 5:
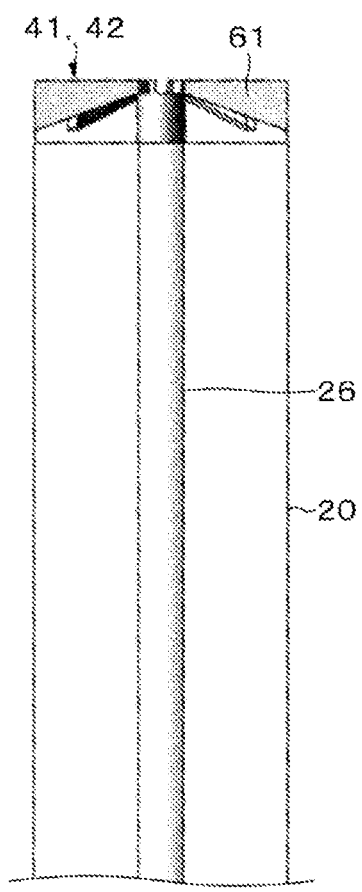
FIG. 5 is a view showing Example 1 according to an embodiment of the present disclosure.
Figure 6A:
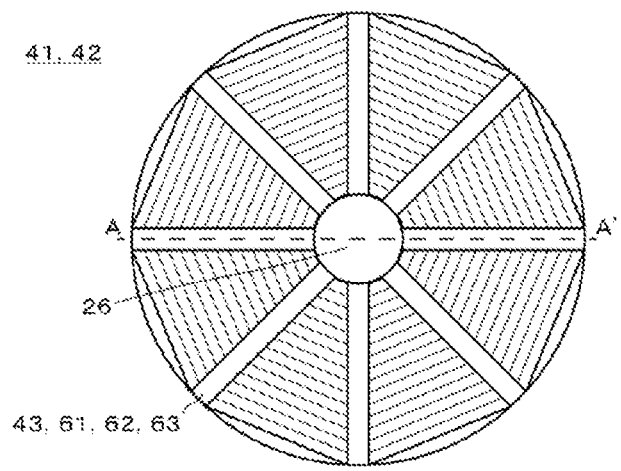
FIG. 6A is a view showing an end face of an electrode wound body according to an embodiment of the present disclosure.
Figure 6B:
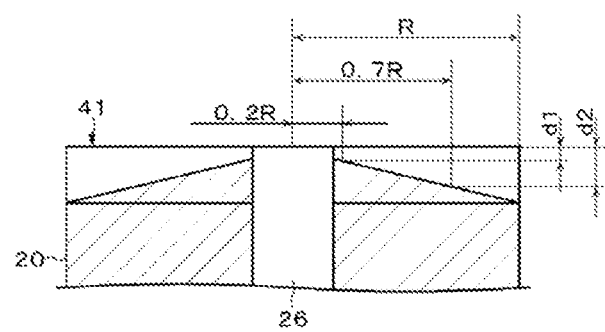
FIGS. 6B and 6C are cross-sectional views of a positive electrode side and a negative electrode side along line AA' in FIG. 6A, specifically showing a definition of a depth of a groove according to an embodiment of the present disclosure.
Figure 6C:
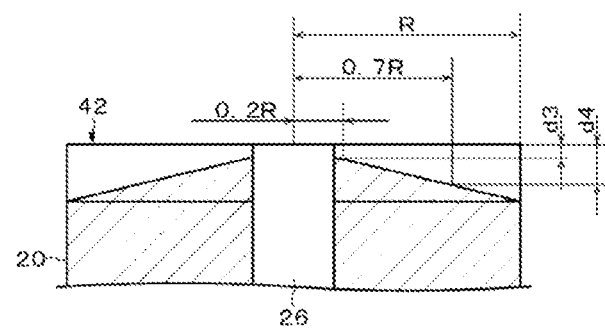

As shown in FIG. 5, sloped grooves 61 are formed in the end faces 41 and 42. Eight grooves were formed in each end face as shown in FIG. 6A. The depth of the groove 61 in an inner peripheral portion was made smaller than the depth of the groove 61 in an outer peripheral portion. Specifically, when the radius of the electrode wound body was R, the depth (d1) from the surface at a position 0.2R away from the central axis of the electrode wound body on the end face 41 (positive electrode side) was set to 0.25 (mm), the depth (d2) from the surface at a position 0.7R away from the central axis of the electrode wound body was set to 0.50 (mm) as shown in FIG. 6B, the depth (d3) from the surface at a position 0.2R away from the central axis of the electrode wound body on the end face 42 (negative electrode side) was set to 0.35 (mm), and the depth (d4) from the surface at a position 0.7R away from the central axis of the electrode wound body was set to 0.90 (mm) as shown in FIG. 6C.

Here, the depth (d1) from the surface at a position 0.2R away from the central axis of the electrode wound body was defined as a depth of the groove in the inner peripheral portion. This is because the depth dimension can be easily measured at a position slightly outside the portion where the active material non-covered portions overlap and are densely gathered in the vicinity of the through hole 26 of the electrode wound body. The depth (d1) from the surface at a position 0.7R away from the central axis of the electrode wound body was defined as a depth of the groove in the outer peripheral portion. This is because the depth dimension can be easily measured slightly closer to the central axis than the vicinity of the outer edge portions 27 and 28 of the electrode wound body.

Example 2

Figure 7:
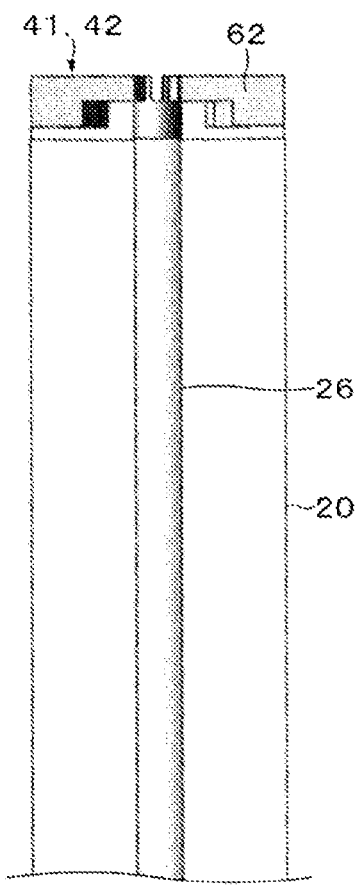
FIG. 7 is a view showing Example 2 according to an embodiment of the present disclosure.

As shown in FIG. 7, stepped groove 62 were formed in the end faces 41 and 42. The depth of each groove 62 in the inner peripheral portion was made smaller than the depth of the groove 62 in the outer peripheral portion. Specifically, the depths were set as d1=0.25 (mm), d2=0.50 (mm), d3=0.35 (mm), and d4=0.90 (mm). The positions of d1 to d4 were the same as the positions shown in FIGS. 6B and 6C. An electrode wound body was produced under the same conditions as in Example 1 except for the above.

Example 3

As shown in FIG. 5, sloped grooves 61 are formed in the end faces 41 and 42. The depth of the groove 61 in an inner peripheral portion was made smaller than the depth of the groove 61 in an outer peripheral portion. Specifically, the depths were set as d1=0.10 (mm), d2=0.35 (mm), d3=0.15 (mm), and d4=0.70 (mm). The positions of d1 to d4 were the same as the positions shown in FIGS. 6B and 6C. The electrode wound body 20 was produced under the same conditions as in Example 1 except for the above.

Comparative Example 1

Figure 8:
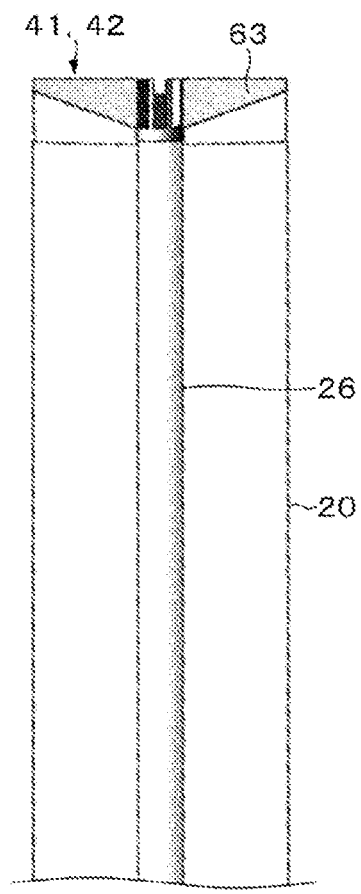
FIG. 8 is a view showing Comparative Example 1.

As shown in FIG. 8, inversely sloped grooves 63 were formed in the end faces 41 and 42. The depth of each groove 63 in the inner peripheral portion was made larger than the depth of the groove 63 in the outer peripheral portion. Specifically, the depths were set as d1=0.50 (mm), d2=0.25 (mm), d3=0.90 (mm), and d4=0.35 (mm). The positions of d1 to d4 were the same as the positions shown in FIGS. 6B and 6C. The electrode wound body 20 was produced under the same conditions as in Example 1 except for the above.

Comparative Example 2

Figure 9:
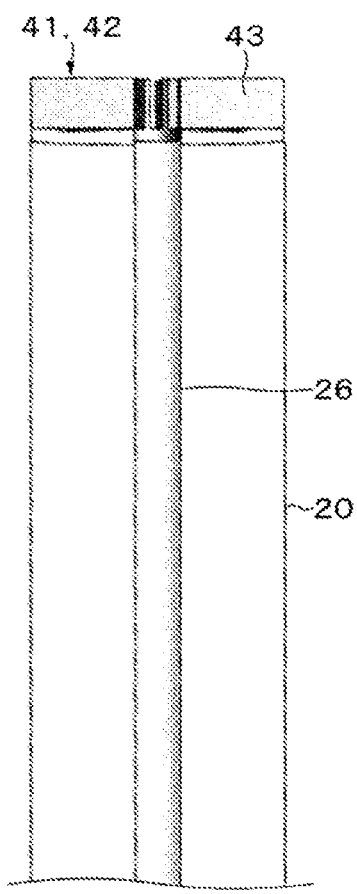
FIG. 9 is a view showing Comparative Example 2.

As shown in FIG. 9, straight grooves 43 were formed in the end faces 41 and 42. The depth of each groove 43 in the inner peripheral portion was set to be the same as the depth of the groove 43 in the outer peripheral portion. Specifically, the depths were set as d1=d2=0.50 (mm), and d3=d4=0.90 (mm). The positions of d1 to d4 were the same as the positions shown in FIGS. 6B and 6C. An electrode wound body was produced under the same conditions as in Example 1 except for the above.

Comparative Example 3

As shown in FIG. 5, sloped grooves 61 were formed in the end faces 41 and 42. The depths of each groove 61 were made larger than that in Example 1. Specifically, the depths were set as d1=0.40 (mm), d2=0.65 (mm), d3=0.50 (mm), and d4=1.10 (mm). The positions of d1 to d4 were the same as the positions shown in FIGS. 6B and 6C. An electrode wound body was produced under the same conditions as in Example 1 except for the above.

Comparative Example 4

As shown in FIG. 5, sloped grooves 61 were formed in the end faces 41 and 42. The depths of the groove were made smaller than that in Example 3. Specifically, the depths were set as d1=0.08 (mm), d2=0.32 (mm), d3=0.12 (mm), and d4=0.60 (mm). The positions of d1 to d4 were the same as the positions shown in FIGS. 6B and 6C. An electrode wound body was produced under the same conditions as in Example 1 except for the above.

Comparative Example 5

The electrode wound body 20 was produced under the same conditions as in Example 1 except that the grooves 61 were not formed in the end faces 41 and 42. The electrode wound body 20 was produced under the same conditions as in Example 1 except for the above.

For each of the above batteries, 100 batteries were produced and evaluated. The positive electrode current collector plate 24 was overlaid on the end face (positive electrode side) 41, and they were laser-welded. The negative electrode current collector plate 25 was overlaid on the end face (negative electrode side) 42, and they were laser-welded. The number of batteries in which welding defects such as holes and spatter were visually confirmed on the current collector plates 24 and 25 after the welding was counted, and the proportion was taken as a welding defect rate.

TABLE 1

| | | | | | | | Welding defect rate (%) | |
| | Groove shape | FIG | Groove depth (mm) | | | | Positive electrode side | Negative electrode side |
| | | | d 1 | d 2 | d 3 | d 4 | | |
|---|---|---|---|---|---|---|---|---|
| Example 1 | sloped | FIG. 5 | 0.25 | 0.50 | 0.35 | 0.90 | 0 | 0 |
| Example 2 | stepped | FIG. 7 | 0.25 | 0.50 | 0.35 | 0.90 | 0 | 0 |
| Example 3 | sloped | FIG. 5 | 0.10 | 0.35 | 0.15 | 0.70 | 0 | 0 |
| Comparative Example 1 | inversely sloped | FIG. 8 | 0.50 | 0.25 | 0.90 | 0.35 | 5 | 7 |
| Comparative Example 2 | straight | FIG. 9 | 0.50 | 0.50 | 0.90 | 0.90 | 3 | 4 |
| Comparative Example 3 | sloped | FIG. 5 | 0.40 | 0.65 | 0.50 | 1.10 | 2 | 3 |
| Comparative Example 4 | sloped | FIG. 5 | 0.08 | 0.32 | 0.12 | 0.60 | 3 | 5 |
| Comparative Example 5 | (no groove) | — | — | — | — | — | 12 | 18 |

Figure 10:
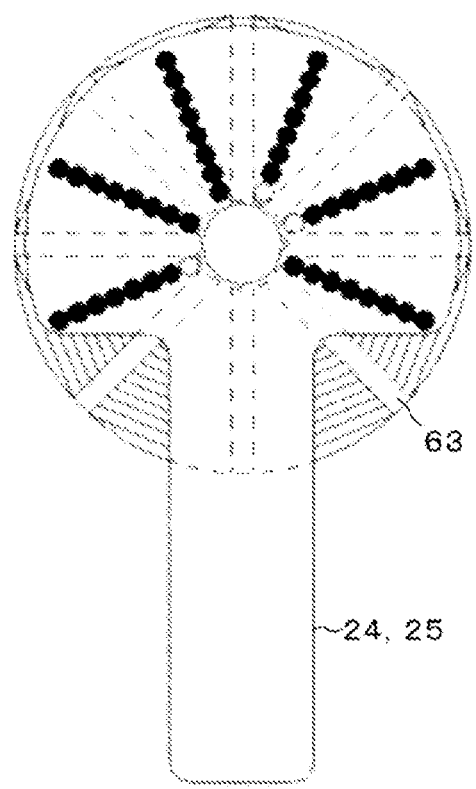
FIG. 10 is a view showing a result of laser welding in Comparative Example 1.
Figure 11:
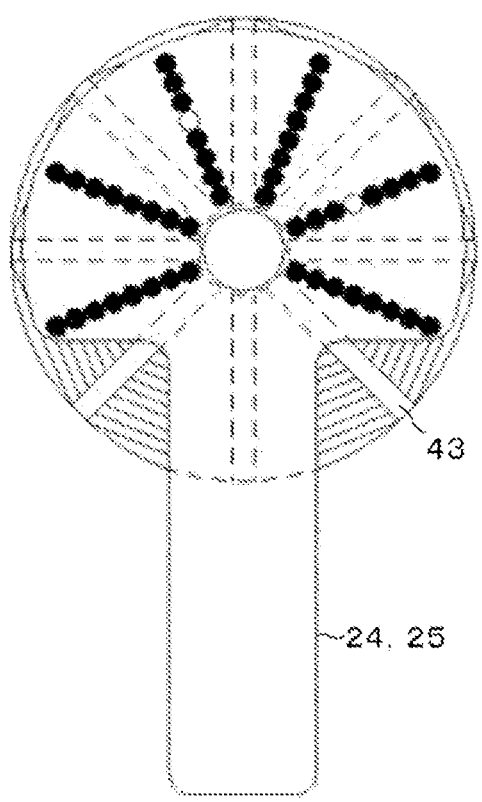
FIG. 11 is a view showing a result of laser welding in Comparative Example 2.

In Examples 1, 2, and 3, the welding defect rate was 0%, and laser welding was successful (not shown), whereas in Comparative Examples 1 to 3, the welding defect rate was not 0%, and laser welding was unsuccessful in some cases. FIG. 10 shows a result of laser welding in Comparative Example 1, and FIG. 11 shows a result of laser welding in Comparative Example 2. In FIGS. 10 and 11, black circles in the drawing indicate successful laser welding points, and white circles in the drawing indicate unsuccessful laser welding points. With the sloped grooves 61 of Example 1 and the stepped grooves 62 of Example 2, because the depth of the grooves in the inner peripheral portion is small, the active material non-covered portion was not dragged much into the grooves at the time of forming the grooves 61 and 62 of the end faces 41 and 42, and it is presumed that it was easy to form a flat face. However, with the straight grooves 43 of Comparative Example 1 and the inversely sloped grooves 63 of Comparative Example 2, because the depth of the grooves in the inner peripheral portion is large, it is considered that the active material non-covered portion was dragged in the grooves at the time of forming the grooves 43 and 63 of the end faces 41 and 42, the flat face could not be formed, and a gap was formed between the current collector exposed portion and the current collector plate. It is presumed that welding is likely to be successful in the inner peripheral portion in Examples 1, 2, and 3, and welding is likely to be unsuccessful in the inner peripheral portion in Comparative Examples 1 and 2. From Table 1, it can be said that when the depth of the grooves in the inner peripheral portion is smaller than the depth of the grooves in the outer peripheral portion, welding failure does not occur or hardly occurs.

Welding failure occurred with the sloped grooves 61 as well when the depth of the grooves on the inner peripheral side was relatively large like in Comparative Example 3. This is presumed to be because the active material non-covered portion was dragged into the grooves at the time of forming the grooves 63 of the end faces 41 and 42 due to the large depth of the grooves in the inner peripheral portion, a flat face was not formed, and a gap was formed between the current collector exposed portion and the current collector plate. Welding failure occurred when the depth of the grooves in the inner peripheral portion was relatively small like in Comparative Example 4. A relatively high value of the welding defect rate was obtained when no groove was formed like in Comparative Example 5. This is presumed to be because wrinkles and voids (gaps, spaces) were generated on the end faces by not forming grooves, and the end faces 41 and 42 did not become flat faces. Therefore, as shown in Table 1, it can be said that no welding defect occurs when 0.10≤d1≤0.25 (mm) and 0.15≤d3≤0.35 (mm).

Although one embodiment of the present disclosure has been specifically described above, the content of the present disclosure is not limited to the above-described embodiment, and various modifications based on the technical idea of the present disclosure can be made.

In the Examples and the Comparative examples, the number of grooves 43 was set to four, but other numbers may be employed. The battery size was 21700, but it may be 18650 or other sizes.

The positive electrode current collector plate 24 and the negative electrode current collector plate 25 include the fan-shaped portions 31 and 33 having a fan shape, but they may have other shapes.

The present disclosure can also be applied to batteries other than the lithium ion battery and batteries having a shape other than a cylindrical shape (for example, a laminate-type battery, a square-type battery, a coin-type battery, or a button-type battery) without departing from the scope of the present disclosure. In such a case, the shape of the "end face of the electrode wound body" may be not only a cylindrical shape but also an elliptical shape, a flat shape, or the like.

Figure 12:
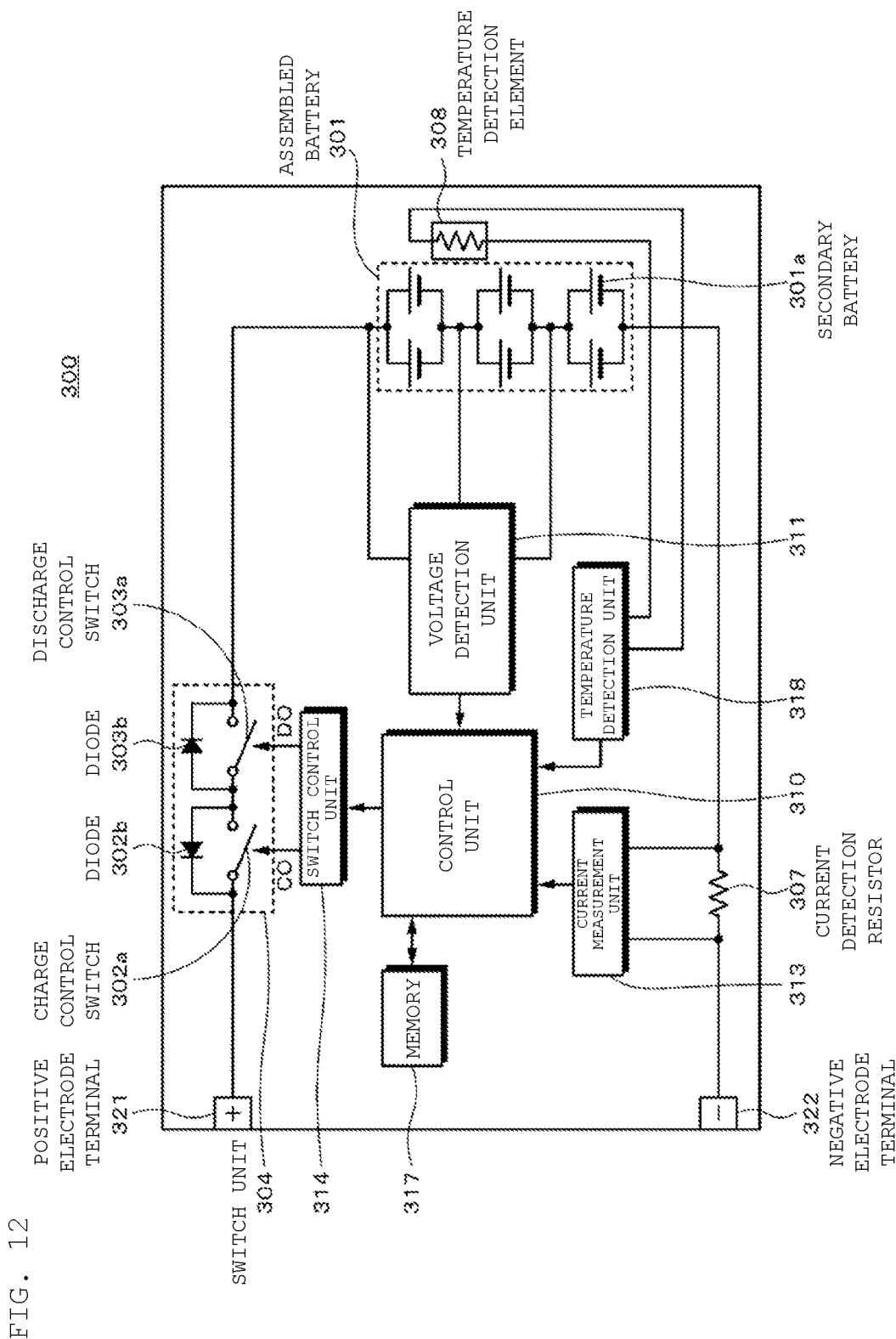
FIG. 12 is a connection diagram used for describing a battery pack as an application example according to an embodiment of the present disclosure.

FIG. 12 is a block diagram showing a circuit configuration example when the battery (hereinafter, the battery is appropriately referred to as secondary battery) according to one embodiment of the present disclosure is applied to a battery pack 330. The battery pack 300 includes an assembled battery 301, an exterior, a switch unit 304 including a charge control switch 302a and a discharge control switch 303a, a current detection resistor 307, a temperature detection element 308, and a control unit (controller) 310.

The battery pack 300 also includes a positive electrode terminal 321 and a negative electrode terminal 322. In charging, the positive electrode terminal 321 and the negative electrode terminal 322 are connected to a positive electrode terminal and a negative electrode terminal of a charger, respectively, and charging is performed. When an electronic device is used, the positive electrode terminal 321 and the negative electrode terminal 322 are connected to a positive electrode terminal and a negative electrode terminal of the electronic device, respectively, and discharging is performed.

The assembled battery 301 is formed by connecting a plurality of secondary batteries 301a in series and/or in parallel. The secondary battery 301a is the secondary battery of the present disclosure. In FIG. 12, a case where six secondary batteries 301a are connected in 2 parallel 3 series (2P3S) is shown as an example, but any other connection method such as u parallel v series (u and v are integers) may be employed.

The switch unit 304 includes a charge control switch 302a, a diode 302b, a discharge control switch 303a, and a diode 303b, and is controlled by the control unit 310. The diode 302b has a polarity in the reverse direction with respect to the charging current flowing from the positive electrode terminal 321 toward the assembled battery 301 and in the forward direction with respect to the discharging current flowing from the negative electrode terminal 322 toward the assembled battery 301. The diode 303b has a polarity in the forward direction with respect to the charging current and in the reverse direction with respect to the discharging current. Although the switch unit 304 is provided on the positive side in the example, it may be provided on the negative side.

The charge control switch 302a is controlled by a charge-discharge control unit to be turned off so that the charging current does not flow through the current path of the assembled battery 301 when the battery voltage reaches the overcharge detection voltage. After the charge control switch 302a is turned off, only discharging is possible through the diode 302b. In addition, the charge control switch 302a is controlled by the control unit 310 to be turned off when a large current flows in charging to cut off the charging current flowing through the current path of the assembled battery 301.

The discharge control switch 303a is controlled by the control unit 310 to be turned off so that the discharging current does not flow through the current path of the assembled battery 301 when the battery voltage reaches the overdischarge detection voltage. After the discharge control switch 303a is turned off, only charging is possible through the diode 303b. In addition, the discharge control switch 303a is controlled by the control unit 310 to be turned off when a large current flows in discharging to cut off the discharging current flowing through the current path of the assembled battery 301. The control unit (controller) 310 includes at least one of a central processing unit (CPU), a processor or the like.

The temperature detection element 308 is, for example, a thermistor, which is provided in the vicinity of the assembled battery 301, measures the temperature of the assembled battery 301, and supplies the measured temperature to the control unit 310. The voltage detection unit 311 measures the voltages of the assembled battery 301 and each of the secondary batteries 301a constituting the assembled battery, performs A/D conversion on the measured voltages, and supplies the converted voltages to the control unit 310. The current measurement unit 313 measures current using the current detection resistor 307 and supplies the measured current to the control unit 310.

The switch control unit 314 controls the charge control switch 302a and the discharge control switch 303a of the switch unit 304 on the basis of the voltage and the current input from the voltage detection unit 311 and the current measurement unit 313. When the voltage of any of the secondary batteries 301a becomes equal to or lower than the overcharge detection voltage or the overdischarge detection voltage, or when a large current rapidly flows, the switch control unit 314 sends a control signal to the switch unit 304 to prevent overcharging, overdischarging, and overcurrent charging and discharging.

Here, for example, when the secondary battery is a lithium ion secondary battery, the overcharge detection voltage is determined to be, for example, 4.20 V±0.05 V, and the overdischarge detection voltage is determined to be, for example, 2.4 V±0.1 V.

As a charge/discharge switch, for example, a semiconductor switch such as a MOSFET can be used. In this case, the parasitic diodes in the MOSFET function as the diodes 302b and 303b. When a P-channel FET is used as the charge/discharge switch, the switch control unit 314 supplies control signals DO and CO to the gates of the charge control switch 302a and the discharge control switch 303a, respectively. When the charge control switch 302a and the discharge control switch 303a are the P-channel type, they are turned on by a gate potential lower than the source potential by a predetermined value or more. That is, in the normal charging and discharging operation, the control signals CO and DO are set to a low level, and the charge control switch 302a and the discharge control switch 303a are turned on.

Then, for example, at the time of overcharging or overdischarging, the control signals CO and DO are set to a high level, and the charge control switch 302a and the discharge control switch 303a are turned off.

The memory 317 includes a RAM and a ROM, and includes, for example, an erasable programmable read only memory (EPROM) which is a nonvolatile memory. In the memory 317, the numerical value calculated by the control unit 310, the internal resistance value of the battery in the initial state of each secondary battery 301a measured at the stage of the manufacturing process, and the like are stored in advance, and can be appropriately rewritten. In addition, by storing the full charge capacity of the secondary battery 301a, for example the remaining capacity can be calculated together with the control unit 310.

The temperature detection unit 318 measures the temperature using the temperature detection element 308, performs charge-discharge control at the time of abnormal heat generation, and performs correction in calculation of the remaining capacity.

The battery according to one embodiment of the present disclosure described above can be used to be mounted on or supply electric power to devices such as electronic devices, electric vehicles, electric aircraft, and power storage devices.

Examples of the electronic devices include notebook computers, smartphones, tablet terminals, PDAs (personal digital assistants), mobile phones, wearable terminals, cordless phone handsets, video movies, digital still cameras, electronic books, electronic dictionaries, music players, radios, headphones, game machines, navigation systems, memory cards, pacemakers, hearing aids, electric tools, electric shavers, refrigerators, air conditioners, televisions, stereos, water heaters, microwave ovens, dishwashers, washing machines, dryers, lighting devices, toys, medical devices, robots, road conditioners, and traffic lights.

Examples of the electric vehicles include railway vehicles, golf carts, electric carts, and electric cars (including hybrid cars), and the battery is used as a driving power source or an auxiliary power source of them. Examples of the power storage devices include a power source for power storage for buildings such as residential houses and power generation facilities.

Among the above-described application examples, a specific example of a power storage system using a power storage device to which the above-described battery of the present disclosure is applied will be described below.

Figure 13:
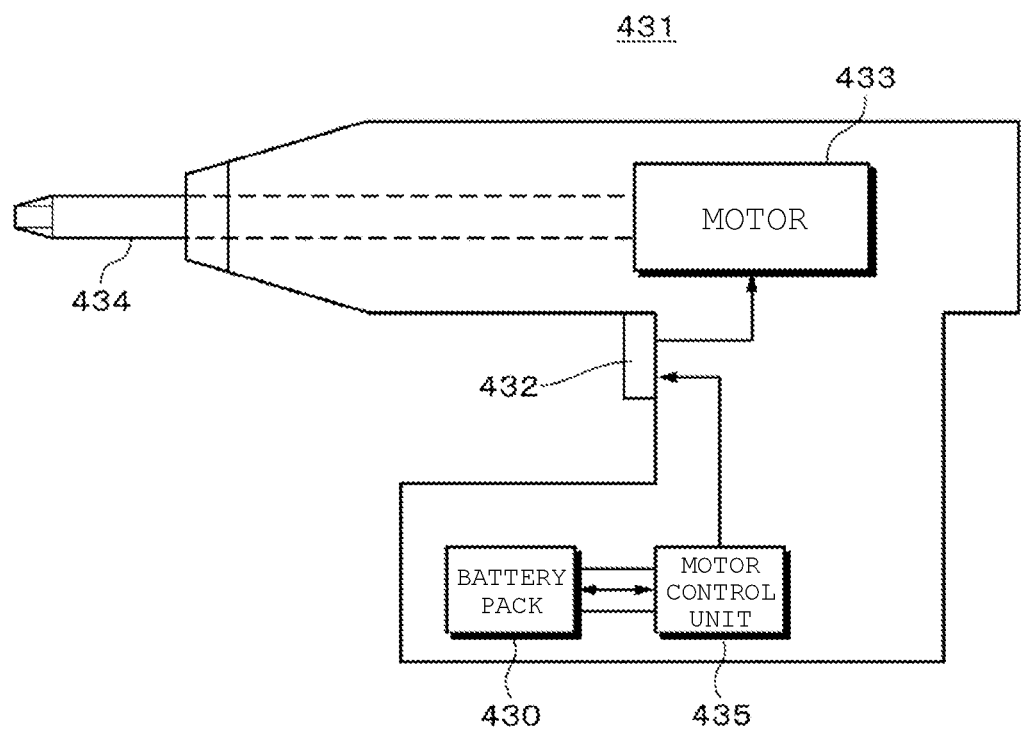
FIG. 13 is a connection diagram used for describing an electric tool as an application example according to an embodiment of the present disclosure.

An example of an electric tool, for example, an electric screwdriver to which the present disclosure can be applied will be schematically described with reference to FIG. 13. In an electric screwdriver 431, a motor 433 such as a DC motor is accommodated in a main body. Rotation of the motor 433 is transmitted to a shaft 434, and a screw is driven into a target object by the shaft 434. The electric screwdriver 431 is provided with a trigger switch 432 to be operated by a user.

A battery pack 430 and a motor control unit (motor controller) 435 are accommodated in a lower housing of a handle of the electric screwdriver 431. As the battery pack 430, the battery pack 300 can be used. A motor control unit (motor controller) 435 controls the motor 433. Each unit of the electric screwdriver 431 other than the motor 433 may be controlled by the motor control unit 435. The battery pack 430 and the electric screwdriver 431 are engaged by respective engagement members provided thereto, which are not shown. As described later, each of the battery pack 430 and the motor control unit 435 (motor controller) includes at least one of a microcomputer, a central processing unit (CPU), a processor or the like. Battery power is supplied from the battery pack 430 to the motor control unit 435, and information on the battery pack 430 is communicated between the microcomputers of the battery pack 430 and the motor control unit 435.

The battery pack 430 is, for example, detachable from the electric screwdriver 431. The battery pack 430 may be built in the electric screwdriver 431. The battery pack 430 is attached to a charging device at the time of charging. When the battery pack 430 is attached to the electric screwdriver 431, a part of the battery pack 430 may be exposed to the outside of the electric screwdriver 431, and the exposed portion may be visible to the user. For example, an LED may be provided in the exposed portion of the battery pack 430 so that the user can confirm light emission and light extinction of the LED.

The motor control unit 435 controls, for example, rotation/stop and a rotation direction of the motor 433. Furthermore, motor control unit 435 cuts off power supply to the load at the time of overdischarging. The trigger switch 432 is for example inserted between the motor 433 and the motor control unit 435, and when the user pushes the trigger switch 432, power is supplied to the motor 433, and the motor 433 rotates. When the user returns the trigger switch 432, the rotation of the motor 433 stops.

Figure 14:
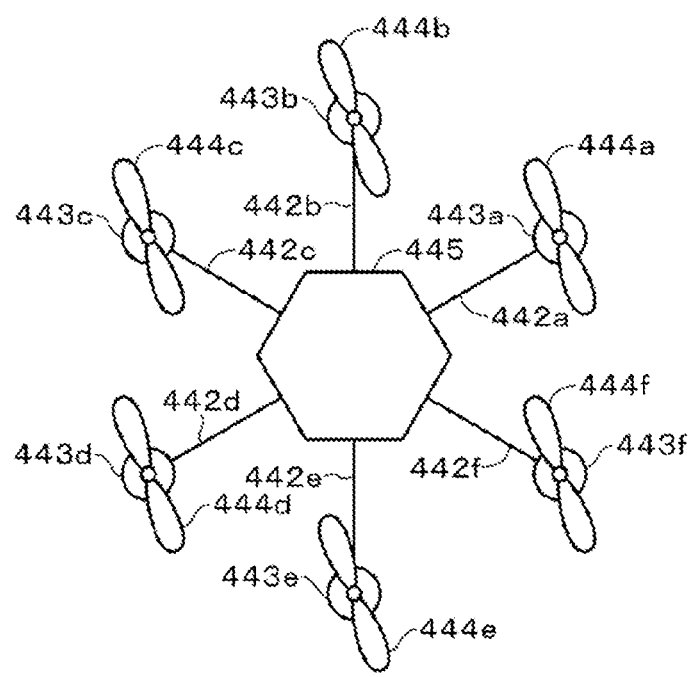
FIG. 14 is a connection diagram used for describing an unmanned aerial vehicle as an application example according to an embodiment of the present disclosure.

An example in which the present disclosure is applied to a power source for an electric aircraft will be described with reference to FIG. 14. The present disclosure can be applied to a power source of an unmanned aerial vehicle (so-called drone). FIG. 14 is a plan view of an unmanned aerial vehicle. A cylindrical or polygonal tubular body as a central portion and support shafts 442a to 442f fixed to an upper portion of the body form a machine body. As one example, the body has a hexagonal tubular shape, and six support shafts 442a to 442f radially extend from the center of the body at equal angular intervals. The body and the support shafts 442a to 442f are made of a lightweight and high-strength material.

Motors 443a to 443f as drive sources of rotary wings are respectively attached to tip portions of the support shafts 442a to 442f. Rotary wings 444a to 444f are attached to the rotary shafts of the motors 443a to 443f. A circuit unit 445 including a motor control circuit (motor controller) for controlling each motor is attached to a center portion (upper portion of the body) where the support shafts 442a to 442f intersect. The motor control circuit (motor controller) includes at least one of a central processing unit (CPU), a processor or the like.

Further, a battery unit as a source of power is disposed at a position below the body. The battery unit includes three battery packs so as to supply electric power to pairs of motors and rotary wings having an opposing interval of 180 degrees. Each battery pack includes, for example, a lithium ion secondary battery and a battery control circuit for controlling charging and discharging. The battery pack 300 can be used as the battery pack. The motor 443a and the rotary wing 444a, and the motor 443d and the rotary wing 444d form a pair. In the same manner, (the motor 443b and the rotary wing 444b) and (the motor 443e and the rotary wing 444e) form a pair, and (the motor 443c and the rotary wing 444c) and (the motor 443f and the rotary wing 444f) form a pair. These pairs are equal in number to the battery pack.

Figure 15:
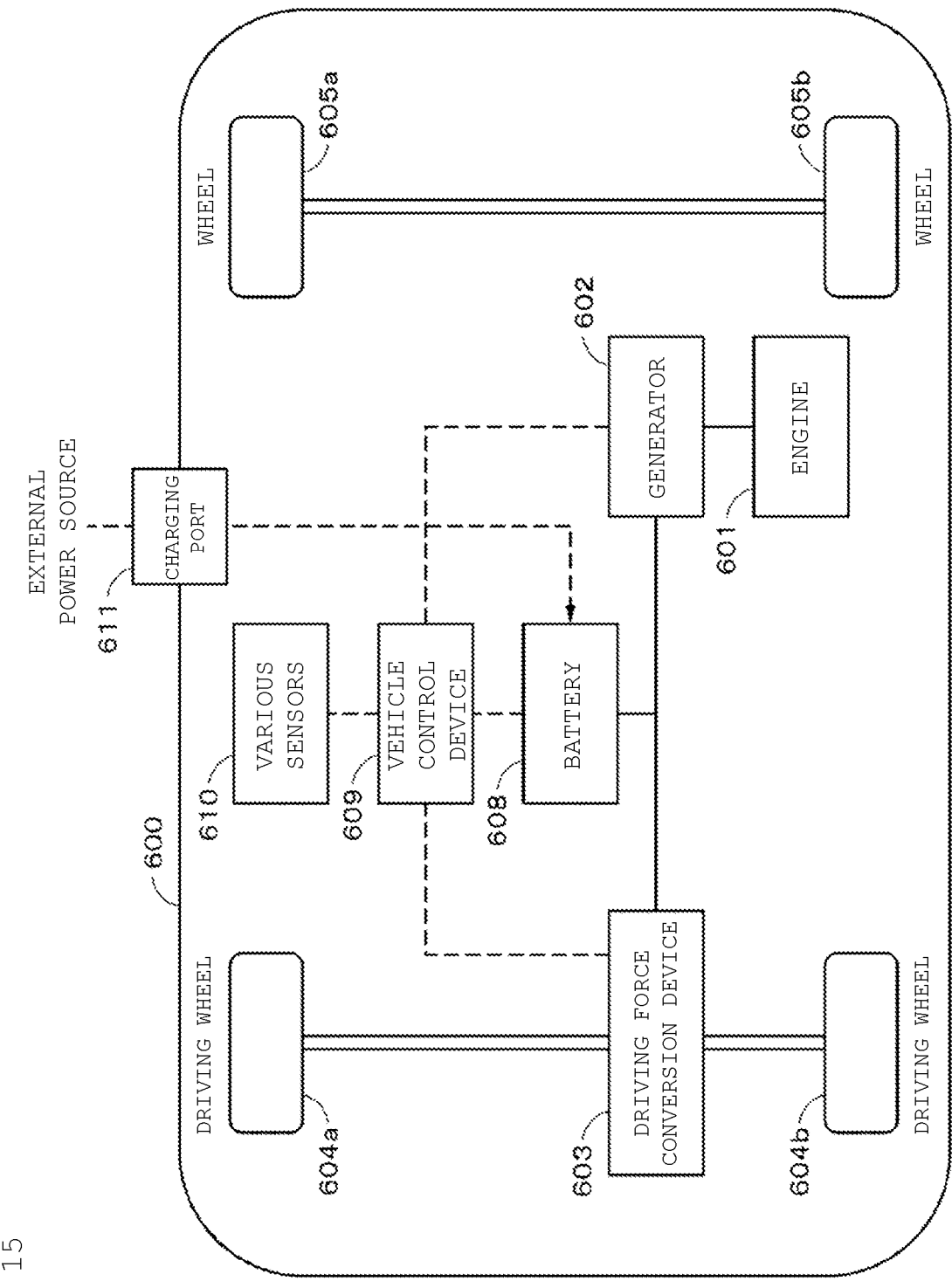
FIG. 15 is a connection diagram used for describing an electric vehicle as an application example according to an embodiment of the present disclosure.

An example in which the present disclosure is applied to a power storage system for an electric vehicle will be described with reference to FIG. 15. FIG. 15 schematically shows one example of a configuration of a hybrid vehicle employing a series hybrid system to which the present disclosure is applied. The series hybrid system is a vehicle that travels with an electric power driving force conversion device using electric power generated by a generator driven by an engine or the electric power temporarily stored in a battery.

In this hybrid vehicle 600, an engine 601, a generator 602, an electric power driving force conversion device 603, a driving wheel 604a, a driving wheel 604b, a wheel 605a, a wheel 605b, a battery 608, a vehicle control device 609, various sensors 610, and a charging port 611 are mounted. The battery pack 300 of the present disclosure described above is applied to the battery 608.

The hybrid vehicle 600 travels using the electric power driving force conversion device (converter) 603 as a source of power. One example of the electric power driving force conversion device 603 is a motor. The electric power driving force conversion device 603 operates by the electric power of the battery 608, and the rotational force of the electric power driving force conversion device 603 is transmitted to the driving wheels 604a and 604b. By using direct current-alternating current (DC-AC) or reverse conversion (AC-DC conversion) where necessary, an alternating-current motor and a direct-current motor can be applied as the electric power driving force conversion device 603. The various sensors 610 control the engine speed through the vehicle control device (vehicle controller) 609 and control the opening degree (throttle opening degree) of a throttle valve (not shown). The various sensors 610 include a speed sensor, an acceleration sensor, an engine speed sensor, and the like. The vehicle control device (vehicle controller) 609 includes at least one of a central processing unit (CPU), a processor or the like.

The rotational force of the engine 601 is transmitted to the generator 602, and electric power generated from the rotational force by the generator 602 can be stored in the battery 608.

When the hybrid vehicle 600 is decelerated by a braking mechanism (not shown), a resistance force at the time of deceleration is applied to the electric power driving force conversion device 603 as a rotational force, and regenerative electric power generated from the rotational force by the electric power driving force conversion device 603 is stored in the battery 608.

By being connected to a power source outside the hybrid vehicle 600, the battery 608 can receive power supply from the external power source using the charging port 611 as an input port and store the received power.

An information processing device that performs information processing related to vehicle control based on information related to the secondary battery may be provided, which is not shown. Examples of such an information processing device include an information processing device that displays the remaining battery level based on information related to the remaining battery level.

In the above, a series hybrid vehicle that travels by a motor using electric power generated by a generator driven by an engine or the electric power temporarily stored in a battery has been described as an example. However, the present disclosure is also effectively applicable to a parallel hybrid vehicle in which both outputs of an engine and a motor are used as drive sources, and three modes of traveling only by the engine, traveling only by the motor, and traveling by the engine and the motor are appropriately switched and used. Furthermore, the present disclosure is also effectively applicable to a so-called electric vehicle that travels by driving only by a drive motor without using an engine.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an electrode wound body having a structure in which a positive electrode and a negative electrode are stacked and wound with a separator interposed therebetween;
a positive electrode current collector plate;
a negative electrode current collector plate; and
an exterior can that accommodates the electrode wound body, the positive electrode current collector plate, and the negative electrode current collector plate, wherein
the positive electrode has a first covered portion covered with a positive electrode active material layer and a positive electrode active material non-covered portion on a positive electrode foil,
the negative electrode has a second covered portion covered with a negative electrode active material layer and a negative electrode active material non-covered portion on a negative electrode foil,
the positive electrode active material non-covered portion is joined to the positive electrode current collector plate on a first end face of the electrode wound body,
the negative electrode active material non-covered portion is joined to the negative electrode current collector plate on a second end face of the electrode wound body,
one or both of the positive electrode active material non-covered portion and the negative electrode active material non-covered portion have a surface formed by at least one of the positive or negative electrode active material non-covered portion bending and overlapping toward a central axis of the wound structure,
the surface has at least one groove extending from an inner peripheral portion toward an outer peripheral portion of the electrode wound body, and
a depth of the groove in the inner peripheral portion is smaller than the groove in the outer peripheral portion;
wherein at least the positive electrode active material non-covered portion has the surface on a positive electrode side formed by the positive electrode active material non-covered portion bending and overlapping toward the central axis of the wound structure, and the groove formed in the surface on the positive electrode side, and 0.10≤ d1≤0.25 (mm)

is satisfied, wherein d1 (mm) represents a depth of the groove at a position 0.2R away from the central axis in the surface on the positive electrode side, and wherein a radius of the electrode wound body is defined as R;
wherein at least the negative electrode active material non-covered portion has the surface on a negative electrode side formed by the negative electrode active material non-covered portion bending and overlapping toward the central axis of the wound structure, and the groove formed in the surface on the negative electrode side, and $$0.15 \leq d3 \leq 0.35 \text{ (mm)}$$

is satisfied, wherein d3 (mm) represents a depth of the groove at a position 0.2R away from the central axis in the surface on the negative electrode side, and wherein a radius of the electrode wound body is defined as R.

2. The secondary battery according to claim 1, wherein the groove has a sloped shape or a stepped shape.

3. The secondary battery according to claim 1, wherein a material of the positive electrode current collector plate includes aluminum or an aluminum alloy.

4. The secondary battery according to claim 1, wherein a material of the negative electrode current collector plate includes nickel, nickel alloys, copper or copper alloys, or a composite material containing two or more of nickel, nickel alloys, copper and copper alloys.

5. The secondary battery according to claim 1, wherein
- a width of the positive electrode active material non-covered portion is larger than a width of the negative electrode active material non-covered portion,
- each of an end face of the positive electrode active material non-covered portion and an end face of the negative electrode active material non-covered portion protrudes outward from the separator, and
- a length of a protruding portion of the positive electrode active material non-covered portion from a first end of the separator in a width direction is larger than a length of a protruding portion of the negative electrode active material non-covered portion from a second end of the separator in the width direction.

6. The secondary battery according to claim 1, wherein the positive electrode active material non-covered portion has an insulating layer at a portion where the positive electrode active material non-covered portion faces the negative electrode with the separator interposed therebetween.

7. The secondary battery according to claim 1, wherein
- the exterior can has an open end face, and
- the open end face is sealed by a sealing plate serving as an external terminal.

8. The secondary battery according to claim 1, wherein a portion without the groove in the surface is joined to at least one of the positive electrode current collector plate or the negative electrode current collector plate by welding.

9. A battery pack comprising:
- the secondary battery according to claim 1;
- a controller configured to control the secondary battery; and
- an exterior body enclosing the secondary battery.

10. An electronic device comprising the secondary battery according to claim 1.

11. An electronic device comprising the battery pack according to claim 9.

12. An electric tool comprising the battery pack according to claim 9 and using the battery pack as a power source.

13. An electric aircraft comprising:
- the battery pack according to claim 9;
- a plurality of rotary wings;
- a motor for rotating each of the rotary wings;
- a support shaft that supports each of the rotary wings and the motor;
- a motor controller configured to control rotation of the motor; and
- a power supply line for supplying power to the motor,
- wherein the battery pack is connected to the power supply line.

14. The electric aircraft according to claim 13, comprising:
- a plurality of pairs of the rotary wings facing each other; and
- a plurality of the battery packs, wherein
- the plurality of pairs of the rotary wings and the plurality of the battery packs are equal in number.

15. An electric vehicle comprising:
- the secondary battery according to claim 1;
- a conversion device that receives supply of electric power from the secondary battery to convert the electric power into a driving force of the electric vehicle; and
- a controller configured to perform information processing related to vehicle control based on information related to the secondary battery.

* * * * *